(12) United States Patent
White et al.

(10) Patent No.: US 6,996,584 B2
(45) Date of Patent: Feb. 7, 2006

(54) SYSTEM AND METHOD OF MAINTAINING FUNCTIONAL CLIENT SIDE DATA CACHE COHERENCE

(75) Inventors: Ken White, Cedar Park, TX (US); Rob Reinauer, Austin, TX (US); Chunsheng Sun, Round Rock, TX (US); Richard Arnold, Austin, TX (US); Sunil Jacob, Austin, TX (US); Desmond Tan, Austin, TX (US); Kevin Lewis, Austin, TX (US)

(73) Assignee: Pervasive Software, Inc., Austin, TX (US)

( * ) Notice: Subject to any disclaimer, the term of this patent is extended or adjusted under 35 U.S.C. 154(b) by 353 days.

(21) Appl. No.: 10/144,917

(22) Filed: May 14, 2002

(65) Prior Publication Data

US 2003/0217081 A1 Nov. 20, 2003

(51) Int. Cl.
*G06F 17/30* (2006.01)
*G06F 17/00* (2006.01)
*G06F 15/16* (2006.01)

(52) U.S. Cl. .................. 707/203; 707/8; 707/100; 709/203

(58) Field of Classification Search ............... 707/1–4, 707/8, 10, 100–102, 104.1, 200–205; 709/201, 709/203, 217–219, 224, 226; 711/118, 141, 711/144, 154
See application file for complete search history.

(56) References Cited

U.S. PATENT DOCUMENTS

| | | | |
|---|---|---|---|
| 5,452,447 A | 9/1995 | Nelson et al. ............. 395/650 |
| 5,581,704 A | 12/1996 | Barbara et al. ........ 395/200.09 |
| 5,706,435 A | 1/1998 | Barbara et al. ........ 395/200.09 |
| 5,754,774 A | 5/1998 | Bittinger et al. ....... 395/200.33 |
| 5,907,678 A | 5/1999 | Housel, III et al. ..... 398/200.43 |
| 5,918,244 A | 6/1999 | Percival ..................... 711/119 |
| 6,032,228 A | 2/2000 | Islam et al. ................ 711/133 |
| 6,154,811 A | 11/2000 | Srbljic et al. .............. 711/118 |
| 6,219,676 B1 | 4/2001 | Reiner ....................... 707/201 |
| 6,266,678 B1 | 7/2001 | McDevitt et al. .......... 707/201 |

(Continued)

OTHER PUBLICATIONS

Godlin et al., Method and System for Differential Distributed Data File Storage, Management and Access, Oct. 31, 2002.*

(Continued)

*Primary Examiner*—Jean M. Corrielus
*Assistant Examiner*—Miranda Le
(74) *Attorney, Agent, or Firm*—Brian W. Peterman; O'keefe, Egan & Peterman, LLP (57) ABSTRACT

The present invention provides functional client side data cache coherence distributed across database servers and clients. This system includes an application resident on a client operable to request access to data, and wherein the client is coupled to a local memory cache operable to store requested date. The client is coupled to a remote memory storage system, such as disk storage or network resources by a communication pathway. This remote memory storage system is operable to store data, process requests for specified data, retrieve the specified data from within the remote memory storage system, and transmit the requested data to the client with annotated version information. The data received by the client is verified as being coherent with any downstream linked information stored in the client's local memory cache. Otherwise, updated coherent data is requested, received and verified prior to being used by the client and its resident applications.

24 Claims, 6 Drawing Sheets

U.S. PATENT DOCUMENTS

| | | | |
|---|---|---|---|
| 6,275,860 B1 | 8/2001 | DeForest et al. | 709/230 |
| 6,341,339 B1 | 1/2002 | Kontothanassis et al. | 711/148 |
| 6,760,840 B1 * | 7/2004 | Shimbo et al. | 713/165 |
| 2002/0083183 A1 * | 6/2002 | Pujare et al. | |

OTHER PUBLICATIONS

Spayey, System and Method for Synchronyzing Databases, May 16, 2002.*

* cited by examiner

| | Version Range |
|---|---|
| D1 | 1, 3 (3-3) |
| D2 | 1, 2 (2-3) |
| D3 | 1 (1-3) |

SYSTEM AND METHOD OF MAINTAINING FUNCTIONAL CLIENT SIDE DATA CACHE COHERENCE

TECHNICAL FIELD OF THE INVENTION

The present invention relates generally to systems and methods of maintaining functional data coherence. More particularly, the present invention relates to a system and method for maintaining a functional coherent database cache distributed across both database servers and clients.

BACKGROUND OF THE INVENTION

Figure 1:
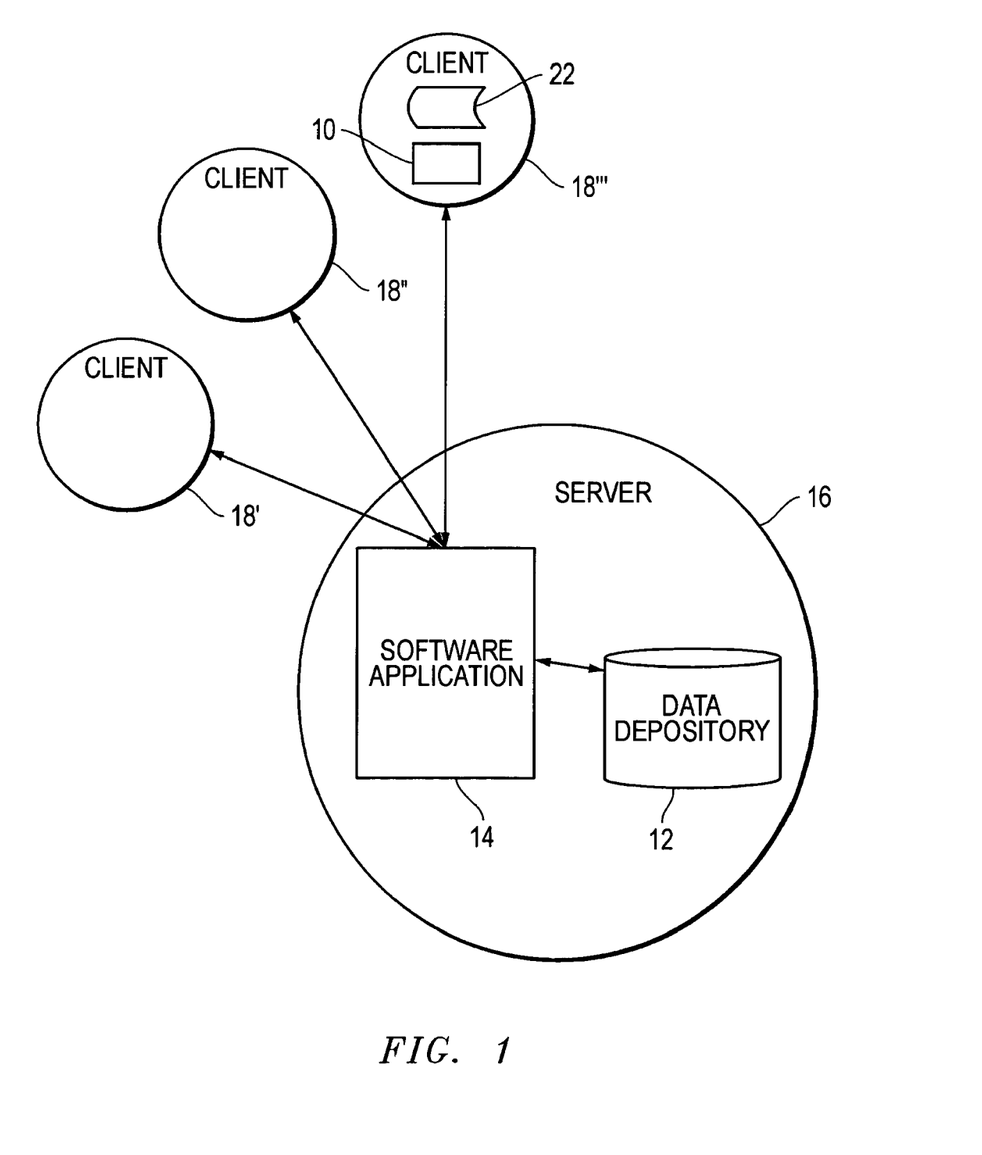
FIG. 1 is used to illustrate problems associated with existing DBMS systems.

A problem associated with current Client Cache Data Cache Systems is illustrated in FIG. 1. Data existing in a data depository 12 is accessed and distributed by a software application 14 resident within server 16. This software application 14 distributes data to various clients 18 (represented as 18', 18", 18'", in FIG. 1), allowing multiple cliental users access data resident in data depository 12. The request for the data is created by applications 10, resident at individual clients 18 (e.g., 18', 18", 18'", in FIG. 1). In order to decrease network traffic between server 16 and individual clients 18 (e.g., 18', 18", 18'", in FIG. 1), it is desirable to store data within a local cache 22. Thus, when frequently accessed data is requested by application 20, redundant data requests to server 16 are eliminated as this data is accessed locally from cache 22. A problem exists when multiple clients access/modify data residing in their local cache 22. This creates a problem where multiple clients 18 (e.g., 18', 18", 18'", in FIG. 1) may access divergent data or continue to access unsynchronized data from their local caches 22.

There are many systems for maintaining data coherency in cache memory. One such system periodically broadcasts a single invalidation report from the server to all of the clients. In this instance, the server and the client operate on the basis of a predetermined window. Periodically, within this window, the server broadcasts all data changes made since the beginning of the previous window. When clients are online, the clients receive the broadcast. If the client has been offline for at least one windowing period, the client invalidates the entire cache. Otherwise, only selected data is validated. It would be desirable to not depend on the use of broadcasting, be dependent on all changes originate from the server, and operate under the assumption of a predetermined, synchronized window of time.

Another method of addressing cache-coherency uses a set of consistency-action matrices. These matrices map consistency actions to the state of a particular cache entry. For example, when a cache entry is in a modify or exclusive state, it changes to having a matrix that ties write access attempts to a consistency action.

Another such method addresses the ability to view file contents on a remote machine and see changes occur to it as they happen.

The present invention addresses the issue of a client request for data from a file server where that file server transmits updates to clients over time. It would be desirable to have the server only transmit the data when requested, thus reducing network traffic. Furthermore, it would be desirable to address partial files and not just entire files. Furthermore, a protocol must be established by which this happens. This requires that a system of versioning (through the protocol) be established that successfully takes advantage of potentially stale but consistent pages.

Another method has been largely concerned with rapid cache propagation. Rapid cache propagation introduces the concept of distributed directories, which act as distributed coherency managers. These peer-to-peer mechanism lack identified protocols or versioning. Typically, server notifies one peer, which is then responsible for locating the correct distributed directory, which in turn must notify all clients.

A mechanism for maintaining a concurrent coherent database cache distributed across both database servers 16 and clients 18 (e.g., 18', 18", 18'", in FIG. 1), would be extremely valuable in addressing this problem. Such a mechanism would enable significant performance enhancements for client/server database read access by allowing remote clients 18 (e.g., 18', 18", 18'", in FIG. 1) to access, recently accessed, server data locally with no required network communication or server interaction, while providing a measure of protection against stale or latent data.

Modern database management systems also use portions of the main memory to hold or cache recently read data from disk storage. Differences in access time between local memory, and network storage systems in database operations necessitate that operations that can be satisfied with cache be satisfied at the local level. Cache access leads to dramatic performance improvements of both local applications and network performance.

Client/server applications offer many advantages for centralized data management and workload partitioning. However, this architecture as shown in 1 introduces a source of data access latency by separating the client application from the data repository by a network connection. In the case where disk access is required to satisfy client application request 24 the network latency imposes minimal penalty relative to the accessing the disk. However, for the cases where the request is satisfied from the network resources, network latency is significant.

Typically, any piece of data is not arrived at directly. Usually several links locate and direct users to the desired data. A simple example is when an individual looks in an index. The index in turn directs the user to a specific page, where the page contains the desired data. Therefore, at a minimum, two pieces of data are required to gather the desired data. These pieces of data are the location in the index that directs the user to a specific page, and the page containing the desired data. Users must verify the index and link in order to avoid any latency problems associated with data. Thus ensuring that the index or link points to the most current data (i.e., the data has not been altered or replaced). For notation purposes, this data, D1, may comprise D1A and D1B. D1A may be viewed as the index and D1B as the page containing the requested data. A latency problem arises when D1A is current and points to a non-existent piece of data D1B. Conversely, a stale D1A may point to stale or nonexistent data D1B. Thus, users are unable to properly access required data. In these cases, the link from D1A to D1B may be completely useless, causing data corruption. It would be extremely valuable to have a data system that guarantees data integrity. To further complicate matters, typically there are many more links and pieces of data required than the two shown in the previous example.

There are two issues not addressed within existing systems. First, it is not clear when locally cached data has become stale or compromised. Second, it is important to verify the consistency of a set of links, which comprise an individual piece of data.

SUMMARY OF THE INVENTION

The present invention provides a system and method for maintaining functional client side data cache coherence that substantially eliminates or reduces disadvantages and problems associated with previously developed systems and methods. More specifically, the present invention provides a system for maintaining functional client side cache coherence that is distributed across a network of database servers and clients.

This system includes an application resident on a client operable to request access to data, and wherein the client is coupled to a local memory cache operable to store requested date. The client is coupled to a remote memory storage system, such as disk storage or network resources by a communication pathway. This remote memory storage system is operable to store data, process requests for specified data, retrieve the specified data from within the remote memory storage system, and transmit the requested data to the client with annotated version information. The data received by the client is verified as being coherent with any downstream linked information stored in the client's local memory cache. Otherwise, updated coherent data is requested, received and verified prior to being used by the client and its resident applications.

The present invention maintains client side data caches for read operations while maintaining functional coherence with a server side data cache. This mechanism enables significant performance enhancements for client/server database read accesses by allowing remote clients to access recently accessed, server based data locally without any required network communication or server interaction.

The present invention provides another technical advantage in that caching at the client means that the client cache may contain information in excess of server cache capacity. The client cache effectively increases the amount of cache available to the application as a whole.

Modern database management systems often use portions of their main memory to hold or cache recently read data from disk storage and to cache or delay writes to disk storage. Because of the drastic differences in access time between main memory and disk storage subsystems, any database operation which can be satisfied through cache instead of requiring disk or network storage access leads to dramatic performance improvements, both in the local application and overall network performance.

Client/Server applications offer many advantages for centralized data management and workload partitioning. However, this architecture introduces a source of data access latency by separating the client application from the data. Cases where local disk access is required to satisfy a client request impose a comparatively minimal latency penalty. However, where network resources satisfy the request, the network latency is extremely significant.

Implementing a local database cache on individual client systems removes the network latency penalty but introduces an extremely complex cache coherency problem. For example, the caches of multiple clients might contain different versions of the same record resulting in unpredictable and erroneous application behavior as the clients attempt to collaborate. To remedy this, the present invention provides a database client cache synchronization mechanism, wherein the present invention allows multiple simultaneous client caches to exist for read operations while preserving a valid single image server centric database model.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention provides a mechanism for maintaining functional client side data caches for read operations while maintaining coherence with a server side data cache. This mechanism enables significant performance enhancements for client/server database read accesses by allowing remote clients to access recently accessed, server based data locally without any required network communication or server interaction.

The present invention provides a system and method for maintaining functional client side data cache coherence distributed across database servers and clients. This system includes an application resident on a client operable to request access to data, and wherein the client is coupled to a local memory cache operable to store requested data. The client is coupled to a remote memory storage system, such as disk storage or network resources by a communication pathway. This remote memory storage system is operable to store data, process requests for specified data, retrieve the specified data from within the remote memory storage system, and transmit the requested data to the client with annotated version information. The data received by the client is verified as being consistent with any downstream linked information stored in the client's local memory cache. Otherwise, updated consistent data is requested, received and verified prior to being used by the client and its resident applications.

The present inventor accomplishes this by using a versioning and aging system to establish the validity of any given record with respect to the other records being accessed by the client application. All write operations are passed through to the server. By preserving versioning coherency among a given set of cached records, multiple different copies of these records can safely and simultaneously exist for read access within multiple database caches.

Specifically, the present invention provides a process for maintaining a client side data cache for read operations while maintaining coherency from a server side data cache.

Figure 2:
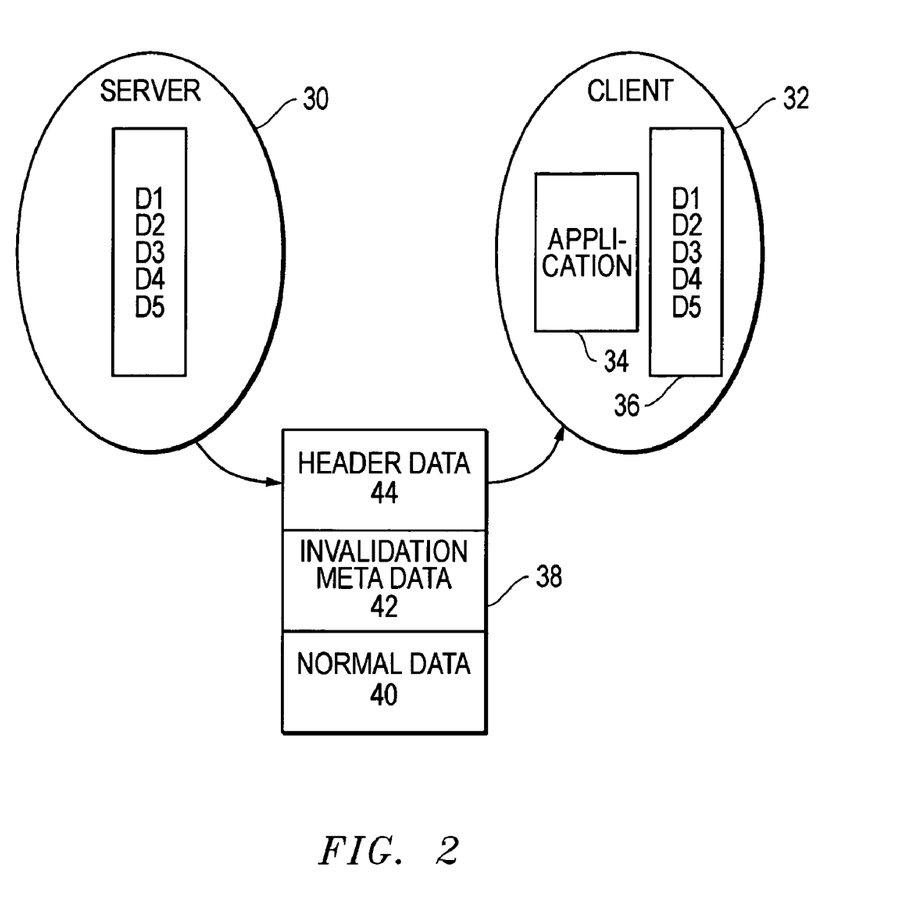
FIG. 2 illustrates the protocol or methodology of the present invention with a five-element dataset.
Figure 3A:
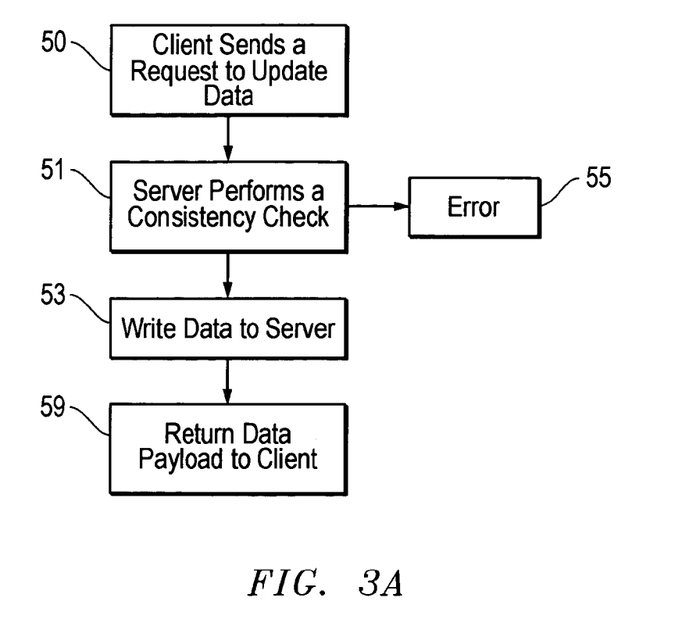
FIGS. 3A and 3B provides a flowchart depicting the process of the present invention.
Figure 3B:
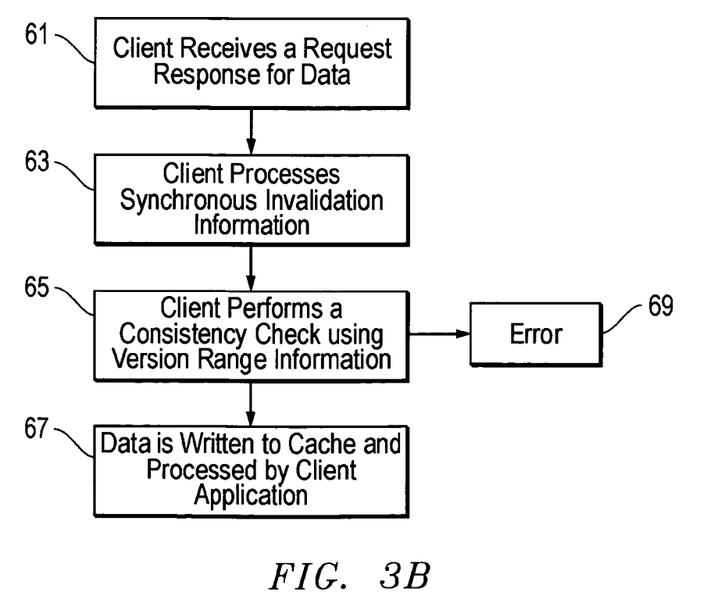

As shown in FIG. 2, five pieces of data are located on server 30. In one example, a change is made in data item, D4. For illustrative purposes, five data items, D1 to D5, are shown in server 30. The present invention would not be limited to this specific number of data items, as more or less data items may be present. This number of data items is shown purely for illustrative purposes. In this process, which is also illustrated in the flow chart provided in FIG. 3A, at step 50, a request to write/modify data D4 is made by client 32 by application 34. This request is sent to server 30. Note that this data is not written directly to the local cache, as this write to item D4 has not been approved by server 30. At step 51, an error check for consistency ensures that latent data is not written to server 30. An error or rejection message informs the client that the write did not take place in step 55 when attempts to write latent data or stale data to server 30 occur. Otherwise, the data is written to server at step 53. At step 59, server 30 returns a data payload to client 32. The payload includes not only the change in data D4 as provided by client 32, and approved at server, but also version information. FIG. 3B illustrates the processes of consistency checking which is performed on receipt of Payload 38 before client application 10 is allowed to process the received data. Payload 38 comprises three parts: header data 44 (including version info.), invalidation meta data 42 (including header information and invalidation instructions), and normal data 40. Invalidation meta data 42 may contain an either synchronous or asynchronous header, depending on the nature of the data request. Following the receipt of Payload 38 in step 61, synchronous invalidation header information is processed in step 63. Asynchronous header information is processed according to user-defined parameters. The invalidation data also comprises an invalidator, which informs the client that data D4 is no longer valid and that should the client need data D4, the data may not be obtained from the local cache 36, but rather must be obtained from the data server 30. After the synchronous invalidation header has been processed, consistency check of the data or links within the payload to the locally cached data or links is performed using version information in step 65. Either an error is generated as shown in step 69, or the data or links are found to be consistent and released to client application in step 67.

Figure 4:
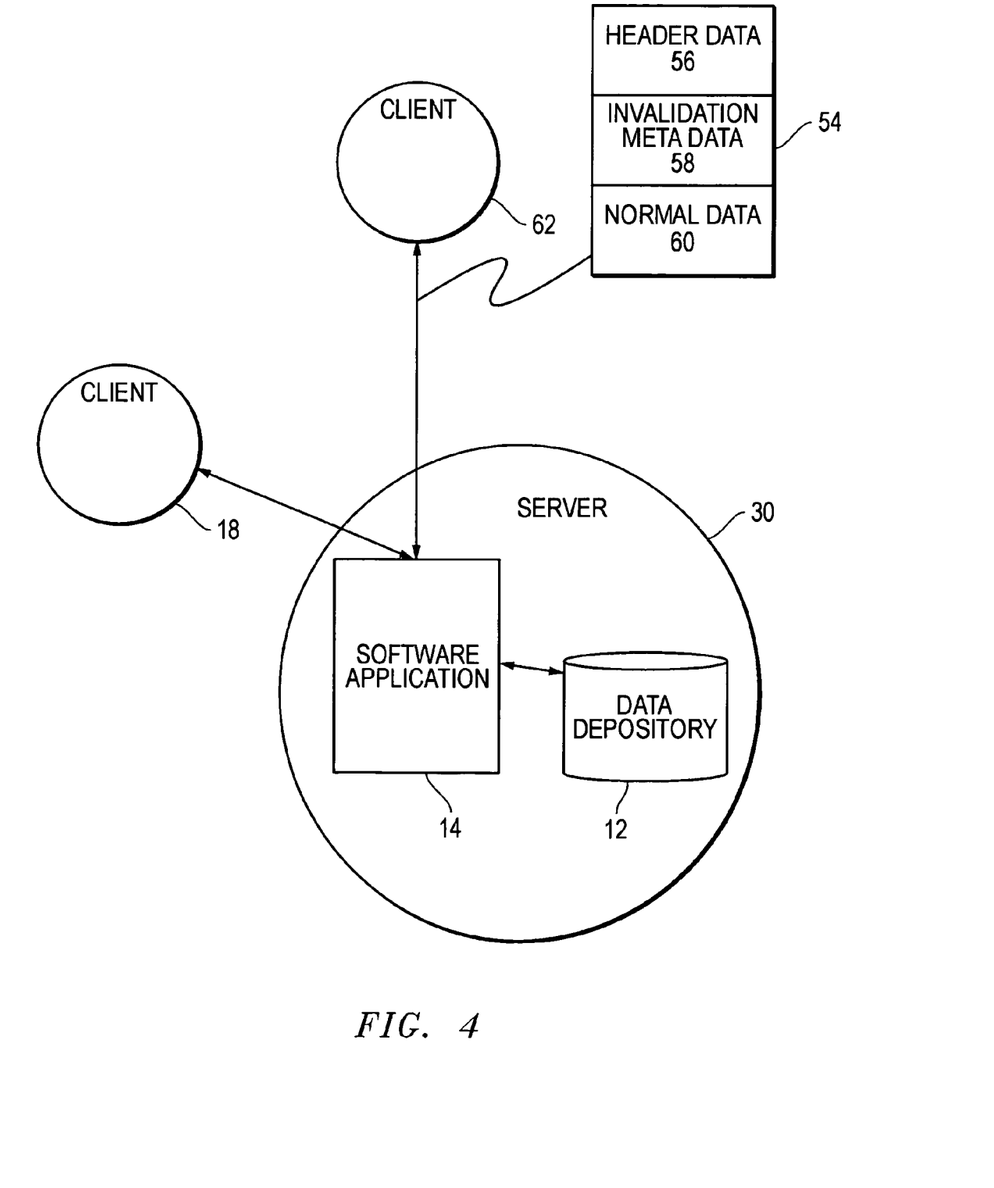
FIG. 4 depicts an embodiment of the present invention involving multiple clients interacting with the server.

In FIG. 4, client 62 has a different set of local data items, including D1, D4, D6, D8, and D9. Server 30 is aware that data D4 has been re-written and is invalid. The server maintains a matter list and a marker indicating which invalidations have been sent to which clients. For this example, client 62 requests an additional piece of data, D10. Client 62 sends a request to server 30 for data D10, which is not stored locally at client 62. The server, in turn, will return data D10 and synchronous and asynchronous invalidation data in payload 54. Payload 54 compromises the header information 56, invalidation meta data 58 (which in this instance comprises a synchronous header for data D10 and an asynchronous invalidation header for data D4), and normal data 60.

It should be noted that payload 54 does not include data D4, but rather a statement that data D4 is invalid, and any other such information from the master list of invalid data from server 30. Server 30 moves the bookmark for client 62 along the list of page invalidations kept at the server, indicating that client 62 has been notified about the changes to data D4.

When client 62 receives payload, client 62 will process the synchronous request for data D10, and then place the invalidation for data D4 in an invalidation queue.

Payload 54 and payload 38 differ significantly, in that payload 54 contains an asynchronous header, while payload 38 contains a synchronous header for data D4. The synchronous header required that data D4 be immediately invalidated and updated in response to the change request for data D4. The asynchronous header places the update to data D4 in an invalidation queue to be processed. Individual clients can determine their acceptable level of staleness by defining how quickly asynchronous requests are processed.

A list of all data that has been changed is maintained at the server until all clients have been informed. After all the clients have been informed, the resources allocated to tracking that change at the server are released for other uses. In this instance data D10 is directly loaded and data D4 is marked for invalidation by the asynchronous header. When client 62 makes a request for data D4, which is currently stale at client 62, there is a request sent to server 30 for data D4.

In another example, a piece of data that is requested and located in D4 is reached through D10 via a link from D10. When D10 is retrieved, downstream links responsive to the request may be requested. Thus, data D4 may be requested as a downstream link from data D10. In this example, data D10 is accessed and contains a link to data D4. The question that arises as to the integrity of data D4 is: "How can one guarantee that the data contained in data D4 is consistent without requesting that data from the server each time?"

Figure 5:
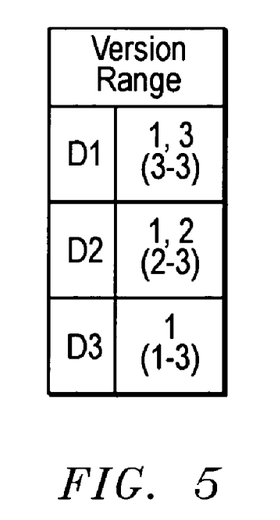
FIG. 5 depicts the method of versioning provided by the present invention.

To address this problem, every piece of data contains not only the normal data, but also version information. FIG. 5 depicts the versioning process provided by the present invention ensures that logically inconsistent data is not displayed or provided to the client. Any time a linkage changes, the version of the associated pages or data associated with that linkage is also updated. Therefore, one has an overall collection of data with assigned versions.

Each data item has a master version starting with a 1. If no version information is present, version 1 is arbitrarily assigned to the data.

As shown in FIG. 5, a change is made to page 2 (DATA ITEM 2) that affect its associated linkages. Therefore, page 2 is updated to linked page version 1. Whenever a linkage changes, the pages are updated with the file's current version. Therefore, the file version was updated to version 2. It should be noted that almost always the page's current version is less than the file's current version. This is due to the fact that a file's pages and changes are usually made only to a limited number of pages. Only the most recently changed page will share the same version as the file. Pages are guaranteed to be consistent with any other page that has a version number that lies between the first page's version number and the file's current version number.

As shown, pages 1 and 3 start with an implied version of version 1. If a linkage is changed on page 1, this creates a file version 3, as a change has already been incorporated into page 2. Therefore, as shown, every page has a version range. The version range shown in this embodiment comprises two digits. The first digit is the file version at which linkages to or from the page were modified. The second digit is the file version at which the Page was supplied to the client. Page 1 has a version range of 3—3. Page 2 has a version range of 2–3. Finally, page 3 has a version range of 1–3.

As clients traverse links, the main concern is for downstream linkages in order to ensure the integrity of data. That is, when a data request is made, the only concern is for the consistency between the link and actual data notation.

Figure 6:
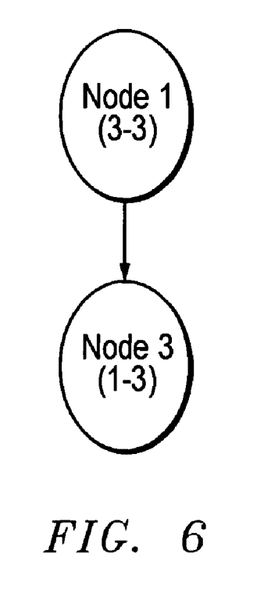
FIG. 6 illustrates a valid link between nodes.

As illustrated in FIG. 6, node 3 is linked to node 1. The version range of node 3 is 1–3.The version range of node 1 is 3—3. No linkages from node 3 have changed. When one examines node 1, one observes page revision 3, file revision 3. Therefore, one is guaranteed consistency from node 1, version range 3—3, to node 3, version range 1–3. Thus, node 3 (page 1) is guaranteed to be consistent between versions shown in the version range.

Figure 7:
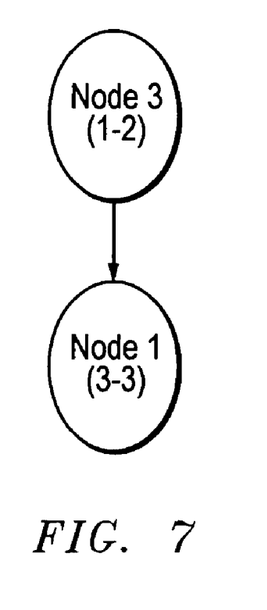
FIG. 7 illustrates an invalid link between nodes.

In another example, as shown in FIG. 7, page 3's version range is 1–2. In this example, page 3 is linked to page 1. Page 1 is updated to version 3—3,and page 3's version range is 1–2. Thus, data integrity is not assured, because linkages have changed between versions 2 and 3.

In another embodiment of the present invention, linkage version and version range is possible. This allows the consistency of the linkage to be verified. The client uses this information to determine that the client must return to the data server in order to ensure data integrity. In actuality, these links are not a single link but rather a plurality of interlinked branches.

Figure 8:
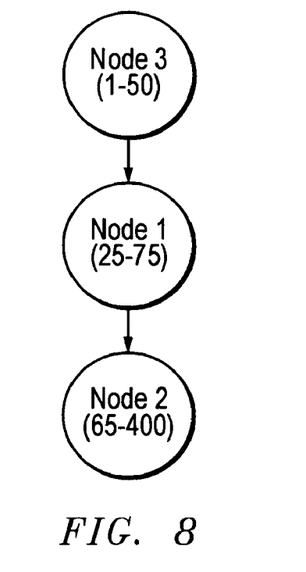
FIG. 8 depicts a more complex, but still valid linkage between nodes according to the present invention.

This is better shown in FIG. 8. Here, node or page 3 has a version range of 1–50. Page 1 has a version range of 25–75, and page 2 has a version range of 65–400. When page 2 was received, the file had been updated 400 times, and page 2 was most recently updated at file version 65. By examining the link between pages 1 and 2, we know that there is consistency due to the overlap between version ranges.

More specifically, page 1, version range 25–75,and page 2, version range 65–400, overlap. Therefore, when traversing to page 2 from page 1, consistency is guaranteed. The consistency between page 3 and page 1 is also guaranteed, as there is overlap in the version range. However, one cannot traverse directly from page 3 to page 2 and guarantee consistency, as there is no version range overlap in the direct linkage. Additionally, one cannot infer that page 3 is consistent through version 400. Pages are versioned and receive updated version information when links to or from the page are updated.

In one embodiment of the present invention, the versions are updated only for downstream links. This is due to the fact that, for consistency purposes, one is primarily concerned with the integrity of downstream data linked to an individual piece of data.

For example, when one is accessing an index, after reading the index page and finding the desired citation, one does not care about changes to the index page. One only is concerned that the index page is linked to the individual citations where the actual data is located.

Figure 9:
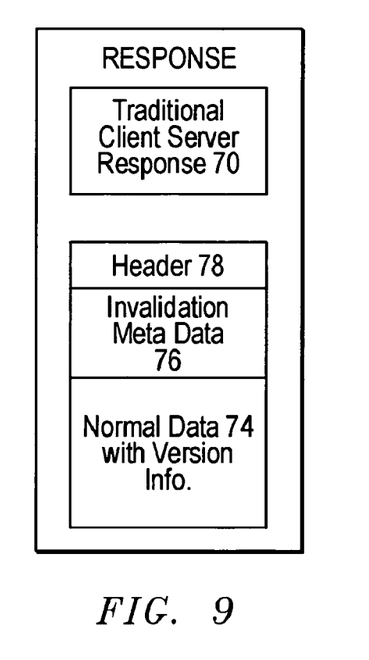
FIG. 9 illustrates a typical payload from the server to a client.

Whenever a request is made to a server, a response will be received comprising the elements contained in FIG. 9. Several pieces of information will be returned as part of the payload. The payload may comprise a traditional client/server response 70. Otherwise, the payload will comprise data to be cached according to the system and method of the present invention. The traditional client server response 70 comprises anything within a transaction, a record log request, or anything that can interfere with a client/server response.

The payload to be cached according to the system and method of the present invention comprises header data 78, synchronous or asynchronous invalidation meta data 76, and normal data 74 (which includes version information). The synchronous invalidation data 76 will be included in payload 72 to update any data written by the individual client and asynchronous invalidation data that relates to cache data maintained by the client. This synchronous invalidation data may occur when there is an actual write of raw data to the server, which is returned to the client, or if there is a transaction where there is a rollback. Furthermore, there are synchronous invalidation data that will comprise several updates. For example, if the index is changed, this may change several downstream pages. Therefore, the client will receive everything that was changed and can no longer be trusted as a result of change that the client made as a result of writing to the server. Payload 72 will also include a data ID, which will update all of the data in cache that the client has received since the last update. However, if too many updates are required, the cache or a section of cache may be flushed.

Asynchronous invalidations are placed in an invalidation queue, thus allowing the client to control the staleness associated with his data. Once a client has written to a server and the write has been accepted or updated, consistency is guaranteed to the client for data with no staleness associated with the write. However, it does not guarantee that no stale data is present at the client.

It should be noted that there is still a possibility that, should a client desire to write data which updates stale data within the client's caches, this write may create an error message, wherein the write is not allowed because the write was based on stale data.

Another embodiment of the present invention may incorporate record lock, wherein individual clients check out and copy data wherein that data may only be updated when the record is returned to the server. This has a disadvantage by greatly impairing the availability of data in the network.

The present invention is extremely valuable in heavy read operations. The present invention improves the execution speed of database operations. It has been observed that the primary cause of latency experienced by an application is not the code itself, but rather the result of either I/O or network costs, with the former being more significant than the latter. Users often experience significant performance degradation for some applications when moving from file-based client side-caching to a client-server-based architecture. File-based client side caching often uses a client having exclusive access to a file when changing the contents of that file. Because clients are protected from concurrent access at the OS level, performance when writes are applied to the file is unacceptably slow.

In that the present invention provides a technical advantage the number of request across the network due to repeated reads are reduced. Every request that can be satisfied at the client eliminates a network round-trip.

The present invention provides another technical advantage in that caching at the client means that the client cache may contain information in excess of server cache capacity. The client cache effectively increases the amount of cache available to the application as a whole.

Additionally, since file server implementations of client-side caching potentially cache (physically) adjacent records in memory when one was asked for, the present invention takes advantage of locality. If two records in a query are located close to each other physically, it is likely that the client-side cache picks the second record up as a result of caching the first. This is because in one embodiment, the cache is page-based, not record-based.

The present invention provides a process for executing client side cache architecture, and a methodology with significant improvements in costs and benefits when compared to existing cache methodologies.

The present invention improves client performance by reducing the number of network requests and reducing I/O by augmenting server-side cache by (the average client cache size* the number of clients). To the extent that performance costs are unacceptable or unnecessary, the present invention provides the ability to tune client caching (or turn it off completely), either automatically or manually, while continuing to provide benefits for other concurrent users.

Many of the distributed cache solutions currently suggested involve a two-phase approach. When one client wants to perform a task, the server must coordinate this task with other clients. This not only results in very poor scaling, but it also relies on guaranteed network availability or else the client has to time out before work can proceed. This approach—a synchronous invalidation approach—is unacceptable. This is unacceptable due to inherent scalability problems, as well as large customer bases are also less likely to have guaranteed network support than would be present within an enterprise environment.

Cache overhead is not the result of the performance work itself, but is instead the by-product of having a distributed cache. It is important that the Database Management System (DBMS) does not incur internal file corruption as a result of the client cache approach. One example of potential file corruption occurs when a DBMS implementation stores what is perceived to be an atomic operation across multiple clients. If the system allows one client to change one entry and another client to change another entry at the same time, it is likely that the persisted data will be in an inconsistent state. An example of this is key pages—one key change may affect multiple key pages.

The present invention also presents an uncorrupted view of the file. Corrupted views can occur when an atomic operation requires multiple page reads to access the data correctly. If these page reads are from two different points in time, it is possible that the DBMS would present invalid data to the application. No file corruption is present, but the clients' applications view of the file is as if the file were corrupted.

Furthermore, the present invention also protects against the corruption of an application caused by the use of inconsistent data. This is where the file maintains consistency as viewed by the DBMS, but becomes inconsistent as far as client applications are concerned. The primary issue here is protecting users from interfering with each other's changes; for instance, where two clients have record "D" in cache. The clients make contradictory changes to the record and attempt to post the change. If the DBMS accepts both changes, it will have effectively negated one user's changes. This is because after a first change is posted, any additional change may be based on invalid data. This is unacceptable.

Finally, the present invention ensures that the occurrence of forced transaction restarts is acceptable. This is accomplished by pulling requests from the server without piggybacking. There are some designs where protection from application corruption involves re-posting a transaction. The frequency of re-posts should be in line with application expectations.

The present invention provides several distinct advantages in that client performance is significantly improved across targeted application domains.

The present invention avoids corruption at various levels is avoided. Specifically, internal file corruption does not occur as a result of the client cache; DBMS view corruption does not occur as a result of the client cache; Application corruption does not occur as a result of the client cache; and Forced transaction restarts are a frequency and quality that is within application expectations.

The present invention focuses on improving client caching in a heavy read operations. Read operations are the primary beneficiaries of a client-side cache. When reading an object, the client cache keeps the object in local memory as long as possible (perhaps using an MRU-LRU algorithm). When writing an object, however, the client makes changes both to the local cache and immediately to the server (as in the typical client/server model). Lock requests and transaction boundaries may be immediately passed to the server. Furthermore, all requests that are part of a transaction are also passed to the server (including reads) because the overhead for maintaining a client's version of a page in the client cache would likely require a synchronous invalidation mechanism to be error-proof. These constraints allow the present invention to take advantage of many existing cache consistency mechanisms.

The above considerations allow the present invention to explicit the read-side performance advantage without risk to internal or application-level file corruption. However, it does not completely eliminate the likelihood of stale data. This requires a client cache invalidation mechanism.

In one embodiment of the present invention, pages are cached. However, in other embodiments rows of data, or other like groupings of data may be cached. Page caching allows further performance advantage. These include fraternal caching, which is not quantified, but either positive or negligible. Row caching requires strong prototyping to prove that the loss of fraternal read-ahead did not diminish performance. Page caching fits well within existing code infrastructures.

The most basic embodiment of the present invention comprises of a client and a server. The server contains a traditional software engine and a page server. The page server primarily supports requests for pages by logical page number. It returns pages based on their logical page number. The page server has no knowledge of physical pages, and may also have other duties, such as invalidation, etc.

The client has several components. A client based application talks to a requester. This requester talks to a redirector, which pushes the request to the local cache engine, which will request necessary pages from the page server component of the data server that has ownership of the file of interest.

The present invention significantly improves client performance across the targeted application domain.

The benefits of client side caching include but are not limited to: distribution of memory requirements; distinction of CPU requirements; and the elimination of network request on data that is either re-used or fraternally cached. These benefits are primarily associated with read-intensive environments.

In the present invention, caching benefits outweigh the cost of cache overhead for all applications (i.e., the cost is not incurred outside the targeted application domain) or have the ability to be tuned or bypassed.

Three elements of the design of present invention allow this to be accomplished. Embodiments of the present invention allow client to turn off client cache ability when the benefits of client caching as a whole are outweighed by the costs.

Furthermore, when an application already performs client-side caching within the application, the client side caching ability may be turned off. However, for other applications that run on the same client, the client cache might be desirable. As a result, the client cache should have bypass mechanism that is more granular then the machine level. A "Session ID" would likely be a satisfactory level at which to be able to specify client cache bypass.

If the server receives so many invalidations such that client caching cannot operate efficiently, the client cache must be able to switch to a communication mechanism optimized for updating. In one embodiment, this may be a traditional client-server protocol. If the system state should change to where fewer client invalidations occur, the server should be able to indicate this to the clients, at which point the client cache should enable itself again.

Internal file, view, or application corruptions do not occur as a result of the client cache. Passing writes, locks, and transaction directly to the server prevents internal file corruption.

This approach takes advantage of existing passive concurrency mechanisms. This requires a client- or server-side check of the record-based reference count. Operations that would result in internal- or application-level file corruption are rejected. The client cache has to have some sort of understanding of when it can trust the consistency of the cached data. Many operations require multiple pages to finally retrieve the data. The first page is fixed or understood by the system, and it is used to find the next page, which is used to find the next page, and so on. DBMS view corruption can occur when the client cache incorrectly believes that it has multiple pieces of data in cache that link correctly. This can only happen when a page can be arrived at through multiple linkages. In some cases, it is possible that part of a linkage was retrieved at a different point in time from another linkage traversal, and that the different points in time stand on opposite sides of an event that altered the linkages.

For example, if link C is involved in 2 linkages, A-B-C-D and Z-Y-C-X. The newly initialized client cache traverses the A-B-C-D linkage, so it caches pages A, B, C, & D. At some later point in time, the second linkage is altered (by another client) so that the linkage is now Z-Y-C-W, if the first client has reason to traverse the second linkage. Now, when the client retrieves Z & Y from the server. Y still points to C, a page that the client has cached. Without intervention, the client will use page C from its cache, which will point to X (instead of W). X will be requested from the server, which may have decided to use X to store a completely different type of data than the cache is expecting. Since a combination of synchronous and asynchronous invalidations is used, there is a period of time between when the server receives changes and the client receives changes. Individual clients may adjust internal settings for an acceptable level of staleness. This can result in a system failure, operation failure, or worse, the operation returning invalid data as valid.

It is important to note that this issue is orthogonal to the freshness of the data itself in the current design. While data that is guaranteed to be fresh is guaranteed to be consistent (and also to be slow), it is not the case that data that is guaranteed to be consistent is guaranteed to be fresh. This present invention address cache consistency and data staleness as two separate issues.

The present invention contains invalidations to the smallest possible number of pages without compromising data consistency. This requires that the client cache must be able to recognize that part of the cache is invalid without invalidating the entire thing.

To solve this problem, both the server and the client must identify the points in time for which a page is valid. The present invention adds a version number to each logical page on the server. A version number is simply a counter that is incremented whenever a change occurs to linkages within pages. In other words, version 4000 of a file means that there have been 4000 user transactions that change page linkages.

Whenever a linkage changes on a logical page, the page is updated with the file or "cache section's" current version. As a result, a page's current version is almost always less than the current file version. The page is guaranteed to be consistent with any other page that has a version number that lies between the first page's version and the current version.

The client cache does not necessarily know the current version of a file, since asynchronous invalidation may be used. However, when a page is requested, the client can determine the current version of the file. Therefore, each page request returns not only a page, but also a version range of file versions with which the page is guaranteed to be consistent. Pages are considered consistent if they share any versions with a linking node.

Since linkages are primarily one way, the client does not have to worry about upstream linkages, but only downstream linkages. This means that when a client has linked to another page, the client checks to see that the version of the linking page has at least one version in common with the subsequent linked page. This guarantees that the linking and the linked nodes are consistent. A side effect of this is that whenever a client persists linkages, it must also persist the versions for which the linkages apply (the more granular the persistence, the more granular the invalidations, which result in higher performance.)

There are several interesting facts associated with this mechanism. First of all, a lack of version overlap between two linked nodes does not necessarily guarantee incompatibility along any given linkage. Since multiple linkages are stored per node, the version number is updated when any linkage in a node is altered. Just as is the case with persisted linkages, increased granularity in linkage versioning increases performance. There may be instances where linkage versioning (as opposed to node versioning) is desired for the performance benefits.

Also, because the server guarantees that two links are compatible with each other if they share version numbers, it is possible that long a complex path the intersection of all version numbers is a null set (i.e., there is no version number that is common to all nodes).

An example of this is in the linkage A-B-C. If node A is received at a point in time where the file version on the server was 100, and the version of A is 50. One is guaranteed that linkages persisted in A will link correctly with nodes that have versions between 50 and 100. At file version 200, page B is received, which has a node version of 75. Therefore the linkages in B are compatible with linkages versioned between 75 and 200. Therefore, A & B are consistent. Page C is also received at file version 2002, which was altered at file version 150. The compatibility range for C is 150–200. B is consistent with C. Therefore, the chain A-B-C is guaranteed to be consistent, although a theoretical linkage of A-C would not be. One also cannot assume that A is consistent with pages 50–200, since A may have been changed at version 101. (It may have been changed in a way that did not affect the A-B-C linkage, but did affect the A-C linkage.)

If the client cannot guarantee that two links on existing pages are consistent, it must re-fetch the linked page from the page server. A possible optimization here would be to send the current page version to the server, and have the server only return an acknowledgement if the page remains consistent (and extend the range of guaranteed consistency). It might also be useful to send the pages used in the chain when fetching a new page so that the server can extend their consistency ranges if appropriate.

If a client does not have a page, it requests the page from the page server but must still validate the linkage before trusting it. A pathological condition can occur if the file at the server is undergoing intensive write activity that changes linkages. For example, in the A-B-C-D linkage, A, B, & C are cached, but D is not. When D is fetched, it is found to have an incompatible consistency range. Since one cannot trust this linkage and one cannot traverse upstream, the client must invalidate the entire traversal and re-fetch A, B, C, and D. The present invention fetches one page at a time, so it is possible that by the end of the chain, the intervening linkages has been invalidated. It is up to the client cache to detect this and fallback to a communication mechanism optimized for updating, in some instances, this may be a traditional client-server protocol.

The page versioning mechanism described above provides a guarantee of consistency, but does not make any guarantee that the data in the client cache is still current in regards to the server. For applications that are working against a snapshot of the data, freshness is not an issue as long as the data is consistent.

A problem can occur, though, when the client retrieves data, stores the data in the cache for a long period of time, and then tries to update the data back to the server. The mechanisms for preventing file and application corruption are well understood by those skilled in the art. However, the end result for the user is that the write request will be rejected.

Current applications must accommodate the possibility of a transaction restart. The possibility of stale client data does not require that applications be rewritten. Without intervention, however, it would likely mean that in a highly cached database the frequency of rejected writes would become greater than the frequency of successful writes. Remember, that all operations (including reads) within a transaction context are passed directly to the server. The "transactions" that would be restarted are the write operations that are not placed within the context of a user transaction or those that use records that were read before the transaction began.

For every change made to the server, a given client cache may be aware of the change before data is returned to the application (if the client made the change itself) or it may not be aware of it (if another client made the change). If a client makes a change itself, it is important that the appropriate parts of the client cache be invalidated before the data is returned to the user. Otherwise, a user could make an update, perform a read on the updated record and not see the update (if the cache did not get invalidated before the client performed the post-update read). To enable the client to accurately view its own changes, the client must understand from the write operation which pages should be invalidated.

If a write completes successfully, the client cache processes the write to the extent that it can invalidate the page that was changed. Otherwise when returning the results of the write, the server identifies to the client the page that was invalidated. Note that this must take versioning into account, as the linkages used at the server may be different than those currently stored in the client cache. This might result in the client invalidating additional pages, but would also likely reduce overall staleness (albeit in a manner that is tied to another mechanism).

The problem becomes more interesting when a client needs to be made aware of changes made by another client. This can result in a transaction restart if client A reads a record, client changes the record, and then client A tries to change the record as well. As described earlier, this can happen currently, but as the time differential between the steps increases the likelihood of rejected writes grows. It is required that the client that did not make the changes have some mechanism with which to invalidate cached pages before the frequency of restarted transactions becomes unacceptable.

Invalidation is likely to require tuning based on at least four different data points: These data points include increased experience with distributed cache. As products mature one is better able to arrive at optimal baseline invalidation schemes. If the initial invalidation scheme is tied to another aspect of the system, it is very difficult to take advantage of this experience. Additionally, it may be possible to incorporate intelligence into the invalidation mechanism that can take into account the way the system is being used. This might be accomplished by something as simple as an MRU-like structure or as complex as a neural network. The tuned invalidation scheme may also be based on being able to communicate from the server to the client some information about system state, so as the system applies more changes to the database, the client cache becomes invalidated more frequently.

Finally, users can make assumptions that the product could never make itself (except perhaps over time with AI). For example, if a particular machine or application is only used for reporting, invalidation is completely unnecessary for that machine or application (except as required to present a consistent view of the data). There should not be mechanisms that force unnecessary invalidations on that machine.

It is also important that the invalidation system operate along time independently of client state. A design that is not time based will potentially result in a fully cached database never getting refreshed even though all system inputs would recommend refreshing the data.

In order to reduce point-to-point invalidation requests, clients may piggyback invalidation requests onto normal server requests. However, if there is not a server request in a certain time period, the client will request invalidations from the server.

The page server must maintain a list per file of pages that have been changed. In addition, it must keep a marker for each client cache interested in the file as to which changes have been sent to each individual client cache (since every client cache is on a different schedule, determined by a combination of need & opportunity). Finally, the list must include version information for each page. In one embodiment the list is organized so that all the pages of a commit level are grouped together.

Cache must populate this list for the page server, so a low-cost synchronization mechanism must be used to prevent list corruption.

When the page server receives a request for invalidations, the request must specify the client and the files of interest. The page server then sends out a list for each file of interest. This list includes the logical page numbers of each page that has been updated on the server since the client's last request. The page server then moves the client cache marker to the end of the list for each file. If there are nodes in the list prior to the first client cache marker as a results, then those nodes may be recycled (since they are no longer of interest to any active client). If a client gets stale enough so that for some reason the server cannot keep the list of all invalidations of interest to the client, the page server returns a response that invalidates the entire client cache for that file. The returned invalidations must line up on commit level boundaries, so that the client has either all of the invalidations for a commit level or none of them.

The page server must be aware (through the protocol of the request) whether or not an invalidation request is attached to a page request.

The page server should also return a value that represents the likelihood of any given page being changed in this file. This value can be determined by the number of pages in the file divided by the number of invalidations in a given time. Clients can use this likelihood to adjust their invalidation schedule.

Clients handle the bulk of the work in invalidations. In addition to the primary cache threads, clients must also have an invalidation handler running as a separate thread. On an open (of a file which is interested in freshness), the cache signals the invalidation handler. This invalidation handler has an invalidation queue. Every so often (as indicated by server state and client settings), the invalidation handler will make a request of the page server for invalidations on the files that it is interested in. The client will then place the returned invalidations in the invalidation queue.

When a client cache has to request a page from the server, the client will perform two functions that affect the invalidation handler. First, the client will reset the timing loop of the invalidation handler (probably pausing it as well so that the invalidation scheduler does not resume until after the client cache has completed all interactions with the invalidation thread). The client will also request invalidations for the files of interest. Once the list of invalidations returns, the client cache will add these invalidations to the invalidation handler's queue. Invalidation requests may not get piggybacked onto every page request for performance reasons.

Based on client scheduling, the client will process some or all of the invalidations in the invalidation queue (it may process on commit level boundaries). While this is happening, the invalidation handler has control of the client cache, since it must invalidate cached pages. A page can be invalidated by the setting of an (conceptual) invalidation flag.

The main cache never has to worry about the invalidation schedule, since the invalidation handler guarantees that a page is never invalidated more frequently than necessary. As a result, when user data is on an invalidated page, a thread in the main cache will go and re-request the page from the page server (piggybacking another invalidation request).

Invalidations can be used to update consistency information. Consistency information is maintained through the user of a version range, but the upper limit of that range is the last point at which consistency is guaranteed (based on the time of the acquisition of the page). It may very well be that the page continues to be valid well past its maximum version number. However, if invalidations are processed atomically along commit level boundaries, then a page that is not explicitly invalidated is implicitly guaranteed to be valid through the processed commit level. This information can be used to reduce the number of unnecessary invalidations due to non-guaranteed consistency. This embodiment will have a current file version. When a page is invalidated, the last version at which it is known to be consistent is used as the maximum version number. Otherwise, a page's maximum version number is the cache's current file version.

A page can be determined to be stale without linkages being altered on that page. As a result it is possible for invalidated pages to remain consistent with other pages that are still considered fresh. Therefore, if linkages are consistent, it is not necessary to request fresh versions of stale pages that are used to link pages. However, the final page in the linkage (the one that contains data) must be fresh and consistent with the linking page. If the final page is marked as invalid, then it must be refreshed from the server. If the page returned from the server is not guaranteed to be consistent with the linking page, then the client cache forces the invalidation handler to process all known invalidations. The client cache then makes a second pass down the linkage. These linkages may well be implicitly guaranteed to be consistent with the fresh linked page. Otherwise, the client will treat the linkage as inconsistent and re-fetch pages from the top of the linkage until consistency is guaranteed.

Two main classes of invalidation proposals currently exist, active and passive. In active invalidation, the server pushes invalidations to the client. In passive invalidation, the client either pulls invalidations opportunistically from the server or infers invalidations (or a combination of both). Active invalidation decreases staleness (and the likelihood of rejected writes) but increases network traffic and server workload. Passive invalidation increases the likelihood of staleness, but is less intrusive to overall system performance.

In one embodiment of active invalidations, the server maintains a list of pages changed since the last invalidation. The server batches these pages into a single communication and pushes the list of changes out to each client (through a connectionless protocol). Each client must have a communications component that listens for invalidations. As invalidations are sent out, the client must listen and invalidate the listed pages.

It is possible for the server to keep track of which pages are kept by which client and only send relevant invalidations to each client, but this would require a significant amount of server tracking. In addition, this approach requires that the server always be current with which changes are being made to the client cache. This means that the server must be notified when invalidations are acted upon. This turns the invalidation protocol into a connected protocol and incurs significant accounting duties on the server. This is likely prohibitively expensive in terms of performance.

Even with a connectionless protocol, the communication mechanism referred to above can be costly, particularly as the application scales upward. Server CPU & network bandwidth begin to act as the bottleneck. As a result, the cost of this communication must be minimized. Obviously, the protocol should reduce the cost of this communication as much as possible (logical page numbers are an obvious choice for a page-based cache approach).

One way to reduce the cost is to batch change notifications together so that several invalidations can be sent in a single missive. As the notification becomes more efficient, though, the likelihood of stale client data increases.

Passive invalidation relies on the client to determine when a page should be invalidated. While this can make use of knowledge retrieved from the server, the server does not intervene to invalidate pages. There are at least several factors that can be part of passive invalidation. These are not necessarily either mutually exclusive or mutually compatible.

When a client makes a page, lock, transaction, or write request to the server, the return data not only includes the desired data, but also the pages that should be invalidated on the client as a result of server-side changes. This approach requires that the server keep a list of pages per client that have been changed since the client's last request for invalidations.

The performance characteristics of this mechanism will be sensitive to the use case. The client will not be protected from stale data on the first trip to the server after a period of dormancy. As the client has to go to the server less frequently, it is more likely that the first write will be rejected, but any burst writing after that point is more likely to contain fresh data.

It is possible that the client cache has some timing pattern where it requests invalidations every so often whether an application is actively forcing server requests or not. This aspect could be bypassed, and could be tuned if the timing described above was in place. The client has control of the frequency of invalidation requests since the client makes this decision.

One downside of this is that the server is required to keep track of page changes that need to be sent to each client. This does not necessarily require multiple lists: the server could keep one list per file that was ordered in time and keep a marker for each client that will request invalidations (i.e., clients where invalidations are not bypassed) as to where the client was on the list. As clients move further in time down the list, the earlier list items can be released. This management does not have to be synchronous.

An additional negative is that this will increase network traffic. Since an increase in network data traffic likely requires an increase in network invalidation traffic, data and invalidations can form race conditions, with each contending for limited network bandwidth.

Since the client has some indication of the range of commits that are represented by the cached data, it can invalidate pages that are guaranteed to be consistent, but that it feels may be too old based on the current version of the file. This determination can be tunable at the client and can be influenced automatically by other factors (such as server state).

One downside of this approach is that the client can only compare against the latest file version it has. If the client becomes fully cached with its data of interest in a short time span, the client will have no reason to invalidate any pages unless an automatic invalidation mechanism kicks in. If this occurs, the client may invalidate pages unnecessarily. This could be combined with a request for invalidated pages to reduce unnecessary page requests.

Another negative is that the file version does not represent all changes to the data, but those changes that affect linkages. Many changes may be made to non-indexed fields and this file version would remain the same.

The current embodiment uses a combination of active and passive invalidation. The server keeps a list of changed pages for each client, and the invalidations for a client are added to the response to a request from that client. In this way, the present invention takes advantage of existing network traffic, reducing network overhead (as in the passive approach). However, to guarantee deterministic latency, a client will make invalidation requests to the server if too much time has passed since a passive (i.e. piggybacked) invalidation request. This active invalidation is only used when there is no other traffic between the client and the server and does so in a time-based manner that is determined by the client's configuration." This could either replace or augment all of the invalidation discussion, which was really discovery & not design. The server has knowledge of the frequency with which changes are being introduced to the system. If the server is able to relay this information back to the client, the client can adjust its invalidation mechanism for optimum efficiency based on the state of the system overall. This could be pulled either at the time of page requests or during invalidation requests (if that is implemented).

Although the present invention has been described in detail, it should be understood that various changes, substitutions and alterations can be made hereto without departing from the spirit and scope of the invention as described by the appended claims.

What is claimed is:

1. A system for maintaining functional client side data cache coherence for database caches distributed across database servers and clients, comprising:
   a database file comprising a plurality of data records including one or more linkages between data records;
   an application resident on a database client operable to request access to at least one piece of specified data within a record within the database file, and wherein said client is coupled to a local memory cache, wherein said local memory cache is operable to store a plurality of data records and version information related to the plurality of data records, the version information comprising first values representing versions related to the data records and second value representing versions related to the database file, wherein the application is configured to utilize the version information to determine whether locally cached data records have valid links with respect to each other; and
   a remote memory storage system configured to manage the database file and coupled to said client by a communication pathway, wherein said remote memory storage system is operable to receive the request for at least one piece of specified data, to retrieve the data record for the specified data from the database file or a remote cache, and to transmit the data record and associated version information;
   wherein the database file further comprises a plurality of page, each page including portion of one or more data records, and wherein version information is associated with each page individually;
   wherein said application verifies that any page received from the remote memory storage system is coherent with linked data stored in pages within said local memory cache;
   wherein said application uses version information of both the page received and said linked pages stored in said local memory cache;
   wherein said version information represents a version range and wherein any two pages are coherent when said version range of said pages overlap; and
   wherein said version range comprises a version for when a linkage to or from a page was updated and a file version for when said page was downloaded to the local cache.

2. The system of claim 1, wherein version information is associated with each data record individually.

3. The system of claim 1, wherein any writes to data stored in either said local memory cache or said remote memory storage system are processed by said remote memory storage system prior to executing said write.

4. The system of claim 1, wherein said specified data transmitted from said remote memory storage system is transmitted as part of a data payload, wherein said payload comprises normal data, invalidation information and an invalidation header.

5. The system of claim 4, wherein said normal data comprises said specified data annotated with version information.

6. The system of claim 5, wherein said invalidation header is synchronous or asynchronous.

7. The system of claim 5, wherein invalidations having synchronous invalidation headers are processed first.

8. The system of claim 5, wherein if said invalidation header is asynchronous, said invalidation is placed in an invalidation queue to be processed.

9. The system of claim 8, wherein a user specifies a frequency for processing said invalidation queue.

10. The system of claim 1, wherein said remote memory storage system is a local disk accessed memory system.

11. The system of claim 1, wherein said remote mommy storage system is a network accessed resource.

12. The system of claim 1, wherein said client and said remote memory storage system can switch to a client-server mode for improved efficiency when needed.

13. The system of claim 1, wherein storing pages is tuned.

14. A method for maintaining functional client side data cache coherence in database caches distributed across database servers and clients, comprising:

requesting access to at least one piece of specified data within a data record within a database file utilizing an application resident on a client, and wherein said client is coupled to a local memory cache;

coupling said client to a remote memory storage system, wherein said remote memory storage system is operable to:
      store a database file comprising a plurality of data records including one or more linkages between data records;
      receive a request for at least one piece of specified data from said client;
      retrieve from the database file or a remote cache a data record that includes said at least one piece of specified data; and
      transmit said data record to said client along with version information related to data record, the version information comprising a first value representing a version related to the data record and a second value representing a version related to the database file;

receiving the data record and associated version information at the client;

verifying the data record is coherent with any downstream linked data records stored at said client in said local memory cache; and storing said data record in said local memory cache, if coherency is determined to exist;

wherein the database file further comprises a plurality of pages, each page including portions of one or more data records, and wherein the version information is associated with each page individually;

wherein said application uses version information of both the page received and linked pages stored in said local memory cache to verify coherence;

wherein said version information represents a version range and wherein two pages are coherent when said version range of said two pages overlap; and wherein said version range comprises a version for when a linkage to or from a page was updated and file version for when said a downloaded to the local cable.

15. The method of claim 14, wherein version information is associated with each record individually.

16. The method of claim 14, wherein any writes to said data stored in either said local memory cache or said remote memory storage system are processed by said remote memory storage system prior to executing said write.

17. The method of claim 14, wherein data transmitted from said remote memory storage system comprises a data payload, wherein said payload comprises header information, invalidation meta data, and normal data.

18. The method of claim 17, wherein said normal data comprises said specified data annotated with version information.

19. The method of claim 17, wherein said invalidation meta data comprises a synchronous or asynchronous header.

20. The method of claim 18, wherein invalidations having synchronous invalidation headers are processed first.

21. The method of claim 19, wherein if said invalidation header is asynchronous, said invalidation is placed in an invalidation queue to be processed.

22. The method of claim 21, wherein a user specifies a frequency for processing said invalidation queue.

23. The method of claim 14, wherein said remote memory storage system is a local disk accessed memory system.

24. The method of claim 14, wherein said remote memory storage system is a network accessed resource.

* * * * *

UNITED STATES PATENT AND TRADEMARK OFFICE
CERTIFICATE OF CORRECTION

PATENT NO. : 6,996,584 B2
DATED : February 7, 2006
INVENTOR(S) : Ken White et al.

It is certified that error appears in the above-identified patent and that said Letters Patent is hereby corrected as shown below:

Column 18,
Line 18, delete "value," and insert -- values --.

Column 19,
Line 8, delete "mommy" and insert -- memory --.

Signed and Sealed this

Fourth Day of April, 2006

JON W. DUDAS
*Director of the United States Patent and Trademark Office*